United States Patent
Agarwal et al.

(10) Patent No.: US 9,998,513 B2
(45) Date of Patent: Jun. 12, 2018

(54) SELECTING BITRATE TO STREAM ENCODED MEDIA BASED ON TAGGING OF IMPORTANT MEDIA SEGMENTS

(71) Applicant: International Business Machines Corporation, Armonk, NY (US)

(72) Inventors: Kanak B. Agarwal, Austin, TX (US); Patrick J. Bohrer, Cedar Park, TX (US); Ketaki Borkar, Campbell, CA (US); Trisha E. Hanlon, Austin, TX (US); Ricardo N. Olivieri, Austin, TX (US); John D. Petitto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 14/946,981

(22) Filed: Nov. 20, 2015

(65) Prior Publication Data
US 2017/0094336 A1     Mar. 30, 2017

Related U.S. Application Data

(63) Continuation of application No. 14/868,695, filed on Sep. 29, 2015.

(51) Int. Cl.
| | |
|---|---|
| *H04L 29/06* | (2006.01) |
| *H04N 21/235* | (2011.01) |
| *H04N 21/234* | (2011.01) |
| *H04N 21/647* | (2011.01) |
| *H04L 29/08* | (2006.01) |
| *H04L 12/835* | (2013.01) |
| *H04N 21/232* | (2011.01) |
| *H04N 21/2343* | (2011.01) |

(Continued)

(52) U.S. Cl.
CPC .......... *H04L 65/601* (2013.01); *H04L 47/30* (2013.01); *H04L 65/607* (2013.01);
(Continued)

(58) Field of Classification Search
CPC ......... G06F 17/30067; G06F 17/30203; H04L 2029/06054; H04L 65/4084;
(Continued)

(56) References Cited

U.S. PATENT DOCUMENTS

| | | | |
|---|---|---|---|
| 8,351,513 B2 | 1/2013 | Wen et al. | |
| 8,396,114 B2 | 3/2013 | Gu et al. | |

(Continued)

OTHER PUBLICATIONS

Ozcelebi et al., "An Analysis of Constant Bitrate and Constant PSNR Video Encoding for Wireless Networks," IEEE International Conference on Communications, vol. 11, Jun. 2006, pp. 5301-5306.

(Continued)

*Primary Examiner* — Benjamin R Bruckart
*Assistant Examiner* — Anthony Bantamoi
(74) *Attorney, Agent, or Firm* — Robert A. Voigt, Jr.; Winstead, P.C.

(57) ABSTRACT

A method, system and computer program product for selecting a bitrate to stream encoded media. A manifest file is fetched, where the manifest file contains metadata for encoded media segments which includes tags signifying the associated encoded media segments being important to the viewer. A playback occupancy level is then increased before reaching these tagged media segment(s). A high bitrate (high quality) is selected to stream the tagged media segment(s) which are then fetched and played at the selected high bitrate in response to the new playback buffer occupancy level being above a threshold level. In this manner, those media segments that are of higher importance to the viewer will be viewed in a higher quality since content information is used to select the bitrate to receive the encoded media segments. As a result, the user's quality of experience in viewing media is improved.

8 Claims, 5 Drawing Sheets

(51) Int. Cl.
  *H04N 21/2662* (2011.01)
  *H04N 21/2668* (2011.01)
  *H04N 21/61* (2011.01)
  *H04N 21/845* (2011.01)

(52) U.S. Cl.
  CPC ............ *H04L 65/608* (2013.01); *H04L 67/02* (2013.01); *H04L 67/06* (2013.01); *H04N 21/2323* (2013.01); *H04N 21/2353* (2013.01); *H04N 21/23406* (2013.01); *H04N 21/234345* (2013.01); *H04N 21/2662* (2013.01); *H04N 21/2668* (2013.01); *H04N 21/6125* (2013.01); *H04N 21/64738* (2013.01); *H04N 21/64769* (2013.01); *H04N 21/8456* (2013.01)

(58) Field of Classification Search
  CPC .. H04L 67/1002; H04N 21/21; H04N 21/214; H04N 21/222; H04N 21/2221; H04N 21/2223; H04N 21/2225
  See application file for complete search history.

(56) References Cited

U.S. PATENT DOCUMENTS

| | | |
|---|---|---|
| 8,571,098 B1 | 10/2013 | Ganesan et al. |
| 2008/0123749 A1 | 5/2008 | Bretillon et al. |
| 2012/0197419 A1* | 8/2012 | Dhruv ................ H04N 21/6543 700/94 |
| 2012/0258699 A1* | 10/2012 | Kim .................. H04W 52/0209 455/418 |
| 2013/0067052 A1* | 3/2013 | Reynolds ............ H04L 65/4084 709/223 |
| 2013/0227122 A1* | 8/2013 | Gao ........................ H04L 65/80 709/224 |
| 2013/0262693 A1* | 10/2013 | Phillips ................ H04N 21/222 709/231 |
| 2013/0326024 A1* | 12/2013 | Chen .................. H04L 65/4084 709/219 |
| 2016/0337680 A1 | 11/2016 | Kalagi et al. |

OTHER PUBLICATIONS

Sun et al., "Video Quality Adaptation in Streaming Through Sub-Sequence Multiple Bitrate (MBR) Transmission," IP.com No. 000174531, Sep. 12, 2008, pp. 1-9.

List of IBM Patents or Patent Applications Treated as Related, Nov. 20, 2015, pp. 1-2.

Office Action for U.S. Appl. No. 14/868,695 dated Aug. 14, 2017, pp. 1-26.

Office Action for U.S. Appl. No. 14/868,695 dated Feb. 23, 2018, pp. 1-14.

\* cited by examiner

SELECTING BITRATE TO STREAM ENCODED MEDIA BASED ON TAGGING OF IMPORTANT MEDIA SEGMENTS

TECHNICAL FIELD

The present invention relates generally to adaptive bitrate streaming, and more particularly to selecting the bitrate to stream encoded media based on the user's network bandwidth, the user's CPU capacity, playback buffer level as well as the tagging of media segments important to the viewer.

BACKGROUND

Adaptive bitrate streaming is a technique used in streaming multimedia over computer networks. While in the past most video streaming technologies utilized streaming protocols, such as Real-Time Transport Protocol (RTP) with Real Time Streaming Protocol (RTSP), today's adaptive streaming technologies are almost exclusively based on Hypertext Transfer Protocol (HTTP) and designed to work efficiently over large distributed HTTP networks, such as the Internet.

Adaptive bitrate streaming works by detecting a user's bandwidth and CPU capacity in real time and adjusting the quality of a media stream accordingly. It requires the use of an encoder which can encode a single source media at multiple bitrates (lower bitrates for lower quality and higher bitrates for higher quality) in multiple segments. The client (device that receives the media) then switches between streaming the different media encoding segments at various bitrates (various qualities) depending on available resources.

While such a technique results in very little buffering, fast start time and a good experience for both high-end and low-end connections, the media segments are treated equally important. As a result, the client will select the bitrate of the next media segment solely based on the user's bandwidth and CPU capacity.

Hence, media segments that may be of higher importance to the user (e.g., goals, touchdowns and home runs in sports videos, key moments in movie videos, footage in a news video), may not be selected with the highest quality bitrate since all media segments are treated equally important. As a result, the user's quality of experience in viewing media may be deficient.

BRIEF SUMMARY

In one embodiment of the present invention, a method for selecting a bitrate to stream encoded media comprises fetching a manifest file containing metadata for segments of encoded media, where the metadata comprises tags signifying associated encoded media segments being important to a viewer. The method further comprises reviewing the manifest file to identify any tag information for next N segments of media. The method additionally comprises identifying one or more tags in the manifest file signifying one or more associated encoded media segments being important to the viewer. Furthermore, the method comprises increasing, by a processor, a playback buffer occupancy level before reaching the one or more encoded media segments tagged as being important to the viewer in response to identifying the one or more tags in the manifest file signifying the one or more associated encoded media segments being important to the viewer. Additionally, the method comprises selecting, by the processor, a high bitrate to stream the one or more tagged encoded media segments in response to the increased playback occupancy level being above a threshold level.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for selecting a bitrate to stream encoded media. In one embodiment of the present invention, a manifest file is fetched, where the manifest file contains metadata for encoded media segments which includes tags signifying the associated encoded media segments being important to the viewer. The manifest file is reviewed to identify any tag information for the next N segments of media. One or more tags in the manifest file are identified as signifying the one or more associated encoded media segments being important to the viewer. A playback occupancy level is increased before reaching these tagged encoded media segment(s) in order to ensure there is enough time remaining in the playback buffer to play these tagged media segment(s) in response to identifying these tagged encoded media segment(s) in the manifest file. A high bitrate (high quality) is selected to stream the tagged encoded media segment(s) which are then fetched and played at the selected high bitrate in response to the new playback buffer occupancy level being above a threshold level (e.g., 3 seconds). In this manner, those media segments that are of higher importance to the viewer will be viewed in a higher quality since content information is used to select the bitrate to receive the encoded media segments. As a result, the user's quality of experience in viewing media is improved.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
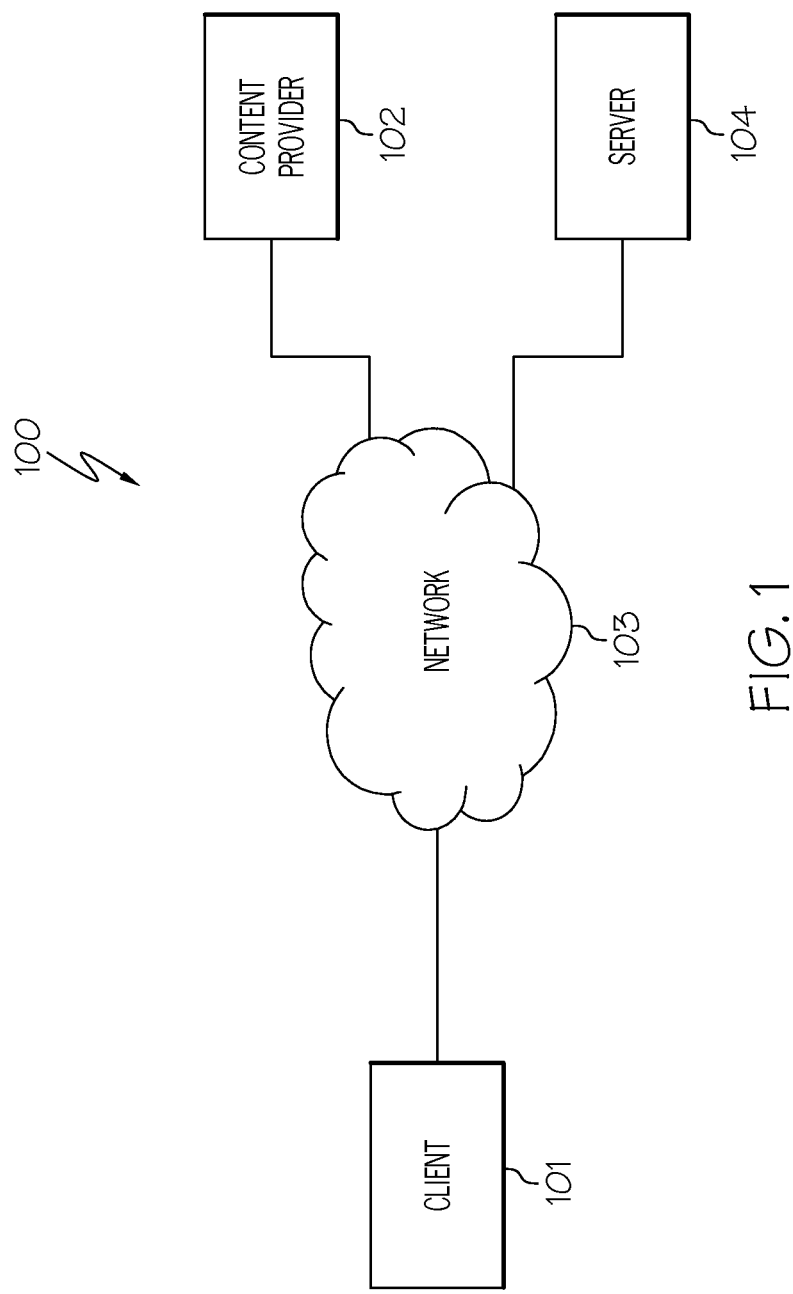
FIG. 1 illustrates a communication system configured in accordance with an embodiment of the present invention.

Referring now to the Figures in detail, FIG. 1 illustrates a communication system 100 for practicing the principles of the present invention in accordance with an embodiment of the present invention. Communication system 100 includes a client 101 connected to a content provider 102 via a network 103.

Client 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with content provider 102. A description of the hardware configuration of client 101 is provided below in connection with FIG. 2.

Client 101 is configured to stream media (e.g., video and audio) over network 103 from content provider 102. Content provider 102 is configured to provide the streamed media to client 101 over network 103 using a protocol, such as HTTP. As discussed in further detail below, content provider 102 encodes media with various bitrates for various levels of quality (low bitrate for lower quality and high bitrate for higher quality). The encoded media is sliced into segments which are stored in a server, such as server 104 connected to content provider 102 via network 103. Content provider 102 then records metadata about the encoded media segments in a manifest file, where the metadata may include tags that indicate importance of the associated media segment to the viewer. By content provider 102 tagging media segments that are important to the viewer, the user's quality of experience in viewing media may be improved as such content information may be used to stream important media segments to the viewer at higher quality (higher bitrate) as discussed further below. For example, media segments of the sports genre that may be of higher importance to the viewer (e.g., user of client 101), such as goals, touchdowns and home runs, may be tagged by content provider 102 as being important to the viewer. In another example, media segments of the news genre that may be of higher importance to the viewer, such as footage as opposed to when the news anchor is speaking, may be tagged by content provider 102 as being important to the viewer. In a further example, media segments of the movie genre that may be of higher importance to the viewer, such as key moments in the movie (e.g., a particular action sequence), may be tagged by content provider 102 as being important to the viewer. In one embodiment, the manifest file is stored in server 104. A description of the hardware configuration of content provider 102 is provided further below in connection with FIG. 3.

System 100 is not to be limited in scope to any one particular network architecture. System 100 may include any number of clients 101, content providers 102, networks 103 and servers 104.

Figure 2:
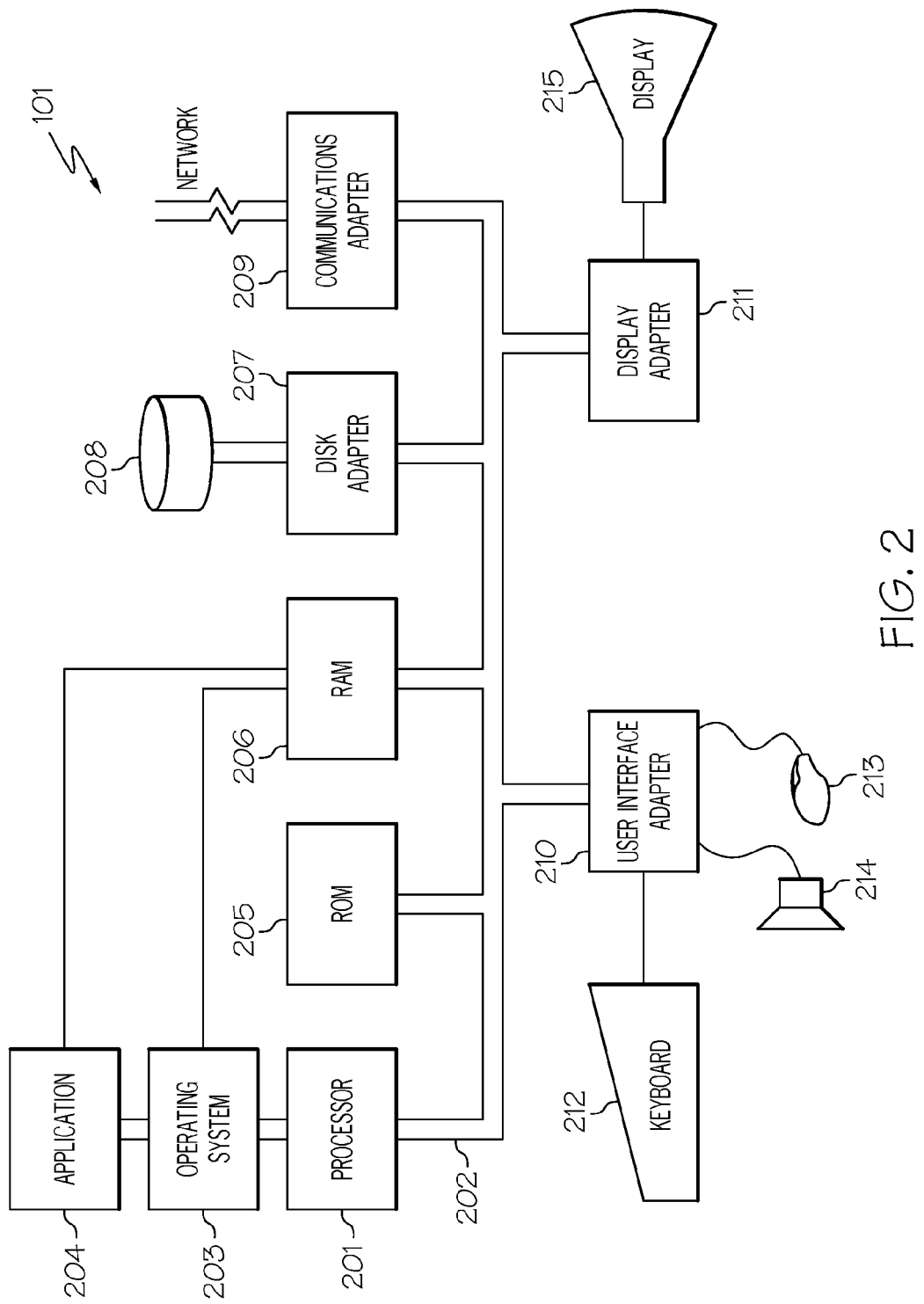
FIG. 2 illustrates a hardware configuration of a client in accordance with an embodiment of the present invention.

Referring now to FIG. 2, FIG. 2 illustrates a hardware configuration of client 101 (FIG. 1) which is representative of a hardware environment for practicing the present invention. Referring to FIG. 2, client 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for selecting a bitrate to stream encoded media using content information, such as the tags of media segments that indicate importance of the media segment to the viewer, as discussed further below in connection with FIG. 6.

Referring again to FIG. 2, read-only memory ("ROM") 205 is coupled to system bus 202 and includes a basic input/output system ("BIOS") that controls certain basic functions of client 101. Random access memory ("RAM") 206 and disk adapter 207 are also coupled to system bus 202. It should be noted that software components including operating system 203 and application 204 may be loaded into RAM 206, which may be client's 101 main memory for execution. Disk adapter 207 may be an integrated drive electronics ("IDE") adapter that communicates with a disk unit 208, e.g., disk drive. It is noted that the program for selecting a bitrate to stream encoded media using content information, such as the tags of media segments that indicate importance of the media segment to the viewer, as discussed further below in connection with FIG. 6, may reside in disk unit 208 or in application 204.

Client 101 may further include a communications adapter 209 coupled to bus 202. Communications adapter 209 interconnects bus 202 with an outside network thereby enabling client 101 to communicate with other devices (e.g., content provider 102, server 104).

I/O devices may also be connected to client 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to client 101 through keyboard 212 or mouse 213 and receiving output from client 101 via display 215 or speaker 214. Other input mechanisms may be used to input data to client 101 that are not shown in FIG. 2, such as display 215 having touch-screen capability and keyboard 212 being a virtual keyboard. Client 101 of FIG. 2 is not to be limited in scope to the elements depicted in FIG. 2 and may include fewer or additional elements than depicted in FIG. 2.

Figure 3:
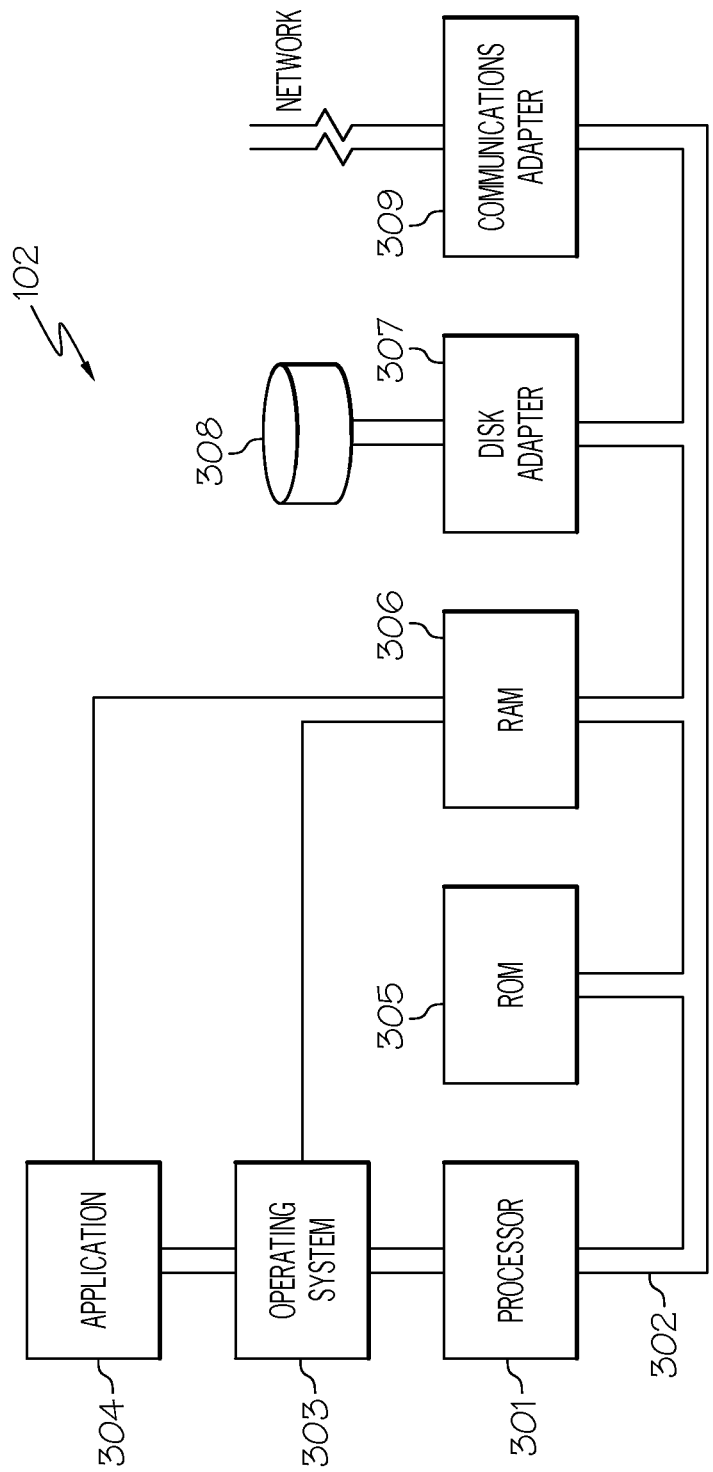
FIG. 3 illustrates a hardware configuration of a content provider in accordance with an embodiment of the present invention.

Referring now to FIG. 3, FIG. 3 illustrates a hardware configuration of content provider 102 (FIG. 1) which is representative of a hardware environment for practicing the present invention. Referring to FIG. 3, content provider 102 has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, a program for tagging important media segments as part of the metadata of the encoded media segments as discussed below in connection with FIGS. 4 and 5.

Referring again to FIG. 3, read-only memory ("ROM") 305 is coupled to system bus 302 and includes a basic input/output system ("BIOS") that controls certain basic functions of content provider 102. Random access memory ("RAM") 306 and disk adapter 307 are also coupled to system bus 302. It should be noted that software components including operating system 303 and application 304 may be loaded into RAM 306, which may be content provider's 102 main memory for execution. Disk adapter 307 may be an integrated drive electronics ("IDE") adapter that communicates with a disk unit 308, e.g., disk drive. It is noted that the program for tagging important media segments as part of the metadata of the encoded media segments, as discussed below in connection with FIGS. 4 and 5, may reside in disk unit 308 or in application 304.

Content provider 102 may further include a communications adapter 309 coupled to bus 302. Communications adapter 309 interconnects bus 302 with an outside network (e.g., network 103 of FIG. 1) thereby enabling content provider 102 to communicate with other devices, such as client 101 of FIG. 1.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, adaptive bitrate streaming works by detecting a user's bandwidth and CPU capacity in real time and adjusting the quality of a media stream accordingly. It requires the use of an encoder which can encode a single source media at multiple bitrates (lower bitrates for lower quality and higher bitrates for higher quality) in multiple segments. The client (device that receives the media) then switches between streaming the different media encoding segments at various bitrates (various qualities) depending on available resources. While such a technique results in very little buffering, fast start time and a good experience for both high-end and low-end connections, the media segments are treated equally important. As a result, the client will select the bitrate of the next media segment solely based on the user's bandwidth and CPU capacity. Hence, media segments that may be of higher importance to the user (e.g., goals, touchdowns and home runs in sports videos, key moments in movie videos, footage in a news video), may not be selected with the highest quality bitrate since all media segments are treated equally important. As a result, the user's quality of experience in viewing media may be deficient.

Figure 4:
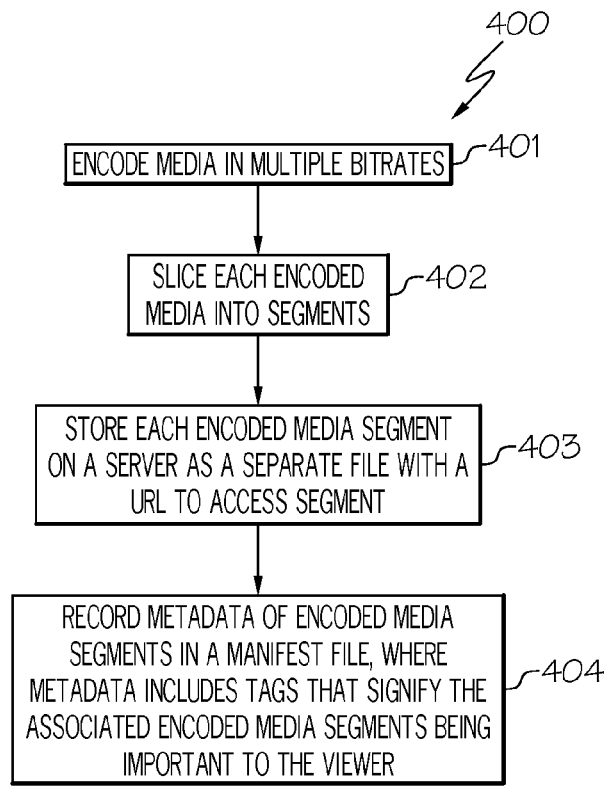
FIG. 4 is a flowchart of a method for tagging important media segments as part of the metadata of the encoded media segments in accordance with an embodiment of the present invention.
Figure 5:
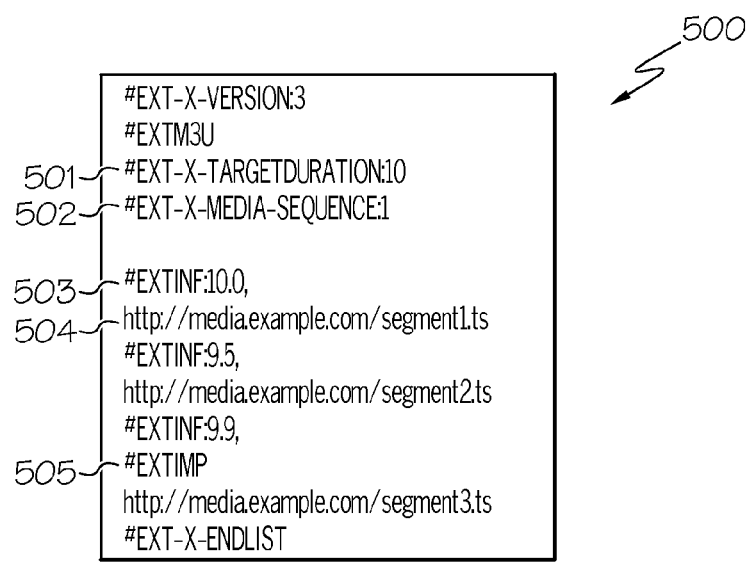
FIG. 5 illustrates the metadata of the encoded media segments stored in a manifest file containing tags of media segments that signify the media segments being important to the viewer in accordance with an embodiment of the present invention.
Figure 6:
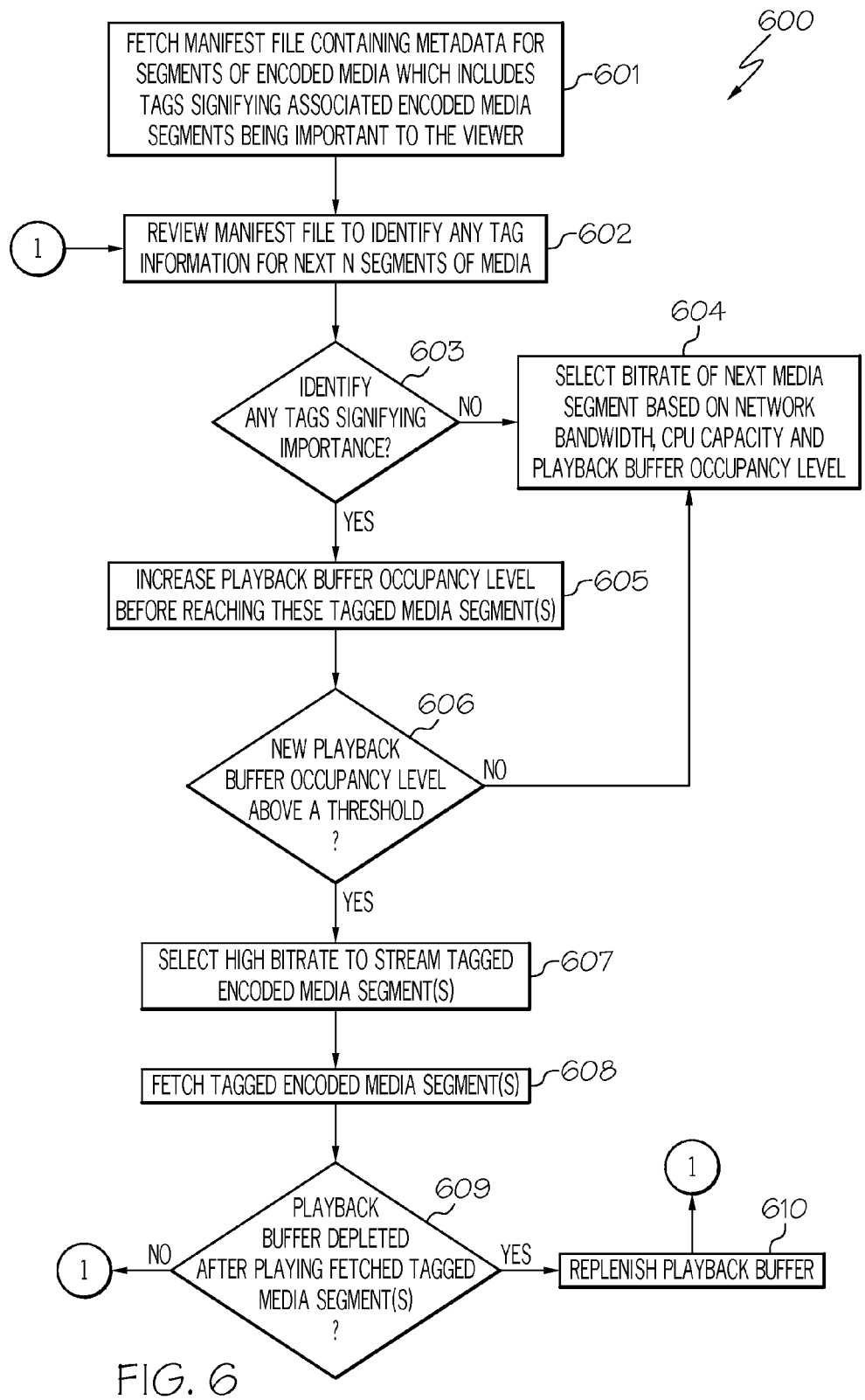
FIG. 6 is a flowchart of a method for selecting a bitrate to stream encoded media using content information, such as the tags of media segments that signify the media segments being important to the viewer, in accordance with an embodiment of the present invention.

The principles of the present invention provide a means for improving the user's quality of experience in viewing media by using content information (those media segments that are tagged for being important to the viewer) during the bitrate selection as discussed below in connection with FIGS. 4-6. FIG. 4 is a flowchart of a method for tagging important media segments as part of the metadata of the encoded media segments. FIG. 5 illustrates the metadata of the encoded media segments stored in a manifest file containing tags of media segments that signify the media segments being important to the viewer. FIG. 6 is a flowchart of a method for selecting a bitrate to stream encoded media using content information, such as the tags of media segments that signify the media segments being important to the viewer.

As stated above, FIG. 4 is a flowchart of a method 400 for tagging important media segments as part of the metadata of the encoded media segments in accordance with an embodiment of the present invention.

Referring to FIG. 4, in conjunction with FIGS. 1 and 3, in step 401, content provider 102 encodes media (e.g., video and audio) in multiple bitrates (various qualities).

In step 402, content provider 102 slices each encoded media into segments (e.g., 2 to 10 seconds) which are stored in server 104.

In step 403, content provider 102 stores each encoded media segment on server 104 as a separate file with a uniform resource locator (URL) to access that given segment.

In step 404, content provider 102 records the metadata of the encoded media segments in a manifest file, which may be stored in server 104. The metadata includes a segment size, an encoded bitrate, the URL, a sequence number of the media segment, a duration of time of the media segment, etc. Furthermore, in one embodiment, the metadata includes tags that signify the associated encoded media segments being important to the viewer as discussed below in connection with FIG. 5.

FIG. 5 illustrates the metadata of the encoded media segments stored in a manifest file 500 containing tags of media segments that signify the media segments being important to the viewer in accordance with an embodiment of the present invention.

Referring to FIG. 5, manifest file 500 includes a tag 501 indicating the maximum duration of time of the encoded media segment. Manifest file 500 further includes a tag 502 indicating the sequence number of the first media segment in the playlist file and a tag 503 indicating the duration of time of the first media segment. Furthermore, as illustrated in FIG. 5, manifest file 500 also includes a tag 504 indicating the uniform resource identifier (URI) or the URL of the first media segment. In one embodiment, manifest file 500 includes a tag 505 indicating that the next media segment is deemed to be of importance to the viewer.

Content information, such as tags 505 indicating the associated encoded media segments being important to the viewer, are used to select the bitrate as discussed below in connection with FIG. 6.

FIG. 6 is a flowchart of a method 600 for selecting a bitrate to stream encoded media using content information, such as tags 505 (FIG. 5) that signify the associated encoded media segments being important to the viewer, in accordance with an embodiment of the present invention.

Referring to FIG. 6, in conjunction with FIGS. 1-2 and 5, in step 601, client 101 fetches manifest file 500 containing metadata for the encoded media segments which includes tags 505 signifying the associated encoded media segments being important to the viewer. As discussed above, in one embodiment, manifest file 500 may be stored in server 104.

In step 602, client 101 reviews manifest file 500 to identify any tag information for the next N segments of media.

In step 603, a determination is made by client 101 as to whether it identified any tags (e.g., tags 505) in manifest file 500 signifying the associated encoded media segments being important to the viewer. For example, client 101 may determine if there are any tags 505 in manifest file 500 that indicate that the next media segment is deemed to be of importance to the viewer.

If client 101 did not identify any tags (e.g., tags 505) in manifest file 500 signifying the associated encoded media segments being important to the viewer, then, in step 604, client 101 selects the bitrate of the next media segment based on the user's network bandwidth, the user's CPU capacity and the playback buffer occupancy level. The playback buffer occupancy level refers to the playtime of the media (e.g., video) remaining in the playback buffer. In one embodiment, such a level is measured in time, such as seconds. In one embodiment, the playback buffer is a portion of memory (e.g., memory 206) in client 101 used to temporarily store the fetched encoded media segments.

If, however, client 101 identified a tag(s) in manifest file 500 signifying the associated encoded media segment(s) being important to the viewer, then, in step 605, client 101 increases the playback buffer occupancy level before reaching these tagged media segment(s) (i.e., the media segment(s) tagged as being important to the viewer) in order to ensure there is enough time remaining in the playback buffer to play the tagged media segment(s). In one embodiment, the playback buffer occupancy level is increased by lowering the bitrate of the preceding non-tagged encoded media segments to intentionally increase the buffer occupancy level in anticipation of fetching the tagged encoded media segment(s). In one embodiment, the playback buffer occupancy level is increased based on the ratio of tagged/non-tagged encoded media segments.

In step 606, a determination is made by client 101 as to whether the new playback buffer occupancy level is above a threshold level (e.g., 3 seconds).

If the new playback buffer occupancy level is not above that threshold level, then client 101 selects the bitrate of the next media segment based on the user's network bandwidth, the user's CPU capacity and the playback buffer occupancy level in step 604.

If, however, the new playback buffer occupancy level is above a threshold level (e.g., 3 seconds), then, in step 607, client 101 selects a high bitrate (high quality) to stream the tagged encoded media segment(s). In this manner, those media segments that are of higher importance to the viewer will be viewed in a higher quality since content information is used to select the bitrate to receive the encoded media segments. As a result, the user's quality of experience in viewing media is improved.

In step 608, client 101 fetches the tagged encoded media segment(s) at the selected high bitrate to be stored in the playback buffer.

In step 609, a determination is made by client 101 to determine whether the playback buffer is depleted after playing the fetched tagged media segment(s).

If the playback buffer is depleted after playing the fetched tagged media segment(s), then, in step 610, client 101 replenishes the playback buffer, such as by lowering the bitrate of succeeding non-tagged encoded media segments. Client 101 then reviews manifest file 500 to identify any tag information for the next N segments of media in step 602.

If, however, the playback buffer is not depleted after playing the fetched tagged media segment(s), then client 101 reviews manifest file 500 to identify any tag information for the next N segments of media in step 602.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for selecting a bitrate to stream encoded media, the method comprising:
  fetching a manifest file containing metadata for segments of encoded media, wherein said metadata comprises tags signifying associated encoded media segments being important to a viewer, wherein said encoded media is encoded in multiple bitrates by a content provider, wherein said content provider slices said encoded media into segments, wherein said content provider stores each encoded media segment on a server as a separate file with a uniform resource locator to access that given segment, wherein said content provider records said metadata of said encoded media segments in said manifest file, wherein said metadata further comprises a segment size, an encoded bitrate, a uniform resource identifier, a sequence number of a media segment and a duration of time of said media segment, wherein said manifest file comprises a first tag indicating a maximum duration of time of an encoded media segment, wherein said manifest file further comprises a second tag indicating a sequence number of a media segment in a playlist file, wherein said manifest file further comprises a third tag indicating a duration of time of said media segment, and wherein said manifest file further comprises a fourth tag indicating a uniform resource identifier of said media segment;
  reviewing said manifest file to identify any tag information for next N segments of media, wherein said N is a positive integer number;
  identifying one or more tags in said manifest file signifying one or more associated encoded media segments being important to said viewer;
  increasing, by a processor, a playback buffer occupancy level before reaching said one or more encoded media segments tagged as being important to said viewer in response to identifying said one or more tags in said manifest file signifying said one or more associated encoded media segments being important to said viewer, wherein said playback buffer occupancy level is a playtime of media remaining in a playback buffer measured in time;
  determining whether said increased playback buffer occupancy level is above a threshold level;
  selecting, by said processor, a high bitrate to stream said one or more tagged encoded media segments in response to said increased playback buffer occupancy level being above said threshold level; and
  selecting a bitrate of a next encoded media segment based on a network bandwidth, a CPU capacity and said playback buffer occupancy level in response to said increased playback occupancy level not being above said threshold level.

2. The method as recited in claim 1, wherein said playback buffer occupancy level is increased by lowering a bitrate of preceding non-tagged encoded media segments.

3. The method as recited in claim 1, wherein said playback buffer occupancy level is increased based on a ratio of tagged/non-tagged encoded media segments.

4. The method as recited in claim 1 further comprising:
  fetching said one or more tagged encoded media segments.

5. The method as recited in claim 4 further comprising:
  replenishing said playback buffer by lowering a bitrate of succeeding non-tagged encoded media segments in response to said playback buffer being depleted after playing said fetched one or more tagged encoded media segments.

6. The method as recited in claim 1, wherein said one or more encoded media segments are tagged as being important to said viewer by a content provider.

7. The method as recited in claim 1,
wherein said playback buffer is a portion of memory in a client device used to temporarily store fetched encoded media segments.
8. The method as recited in claim 5 further comprising:
reviewing said manifest file too identify any tag information for said next N segments of media after replenishing said playback buffer.

\* \* \* \* \*